(12) United States Patent
Onomatsu

(10) Patent No.: US 7,123,310 B2
(45) Date of Patent: Oct. 17, 2006

(54) DIGITAL/ANALOG TELEVISION SIGNAL RECEIVER USING ANALOG SIGNAL CHANNEL FINE-TUNING DATA FOR SETTING DIGITAL SIGNAL CHANNELS

(75) Inventor: Takehiro Onomatsu, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 502 days.

(21) Appl. No.: 09/995,742

(22) Filed: Nov. 29, 2001

(65) Prior Publication Data

US 2002/0066114 A1 May 30, 2002

(30) Foreign Application Priority Data

Nov. 29, 2000 (JP) .................................... 2000-362479

(51) Int. Cl.
*H04N 5/50* (2006.01)

(52) U.S. Cl. .................. 348/732; 348/554; 348/735

(58) Field of Classification Search ............... 348/731, 348/732, 725, 735, 554, 555, 558; 455/183.2, 455/193.2, 186.3
See application file for complete search history.

(56) References Cited

U.S. PATENT DOCUMENTS 5,739,874 A * 4/1998 Badger et al. ............. 348/731
6,421,099 B1 * 7/2002 Oh ............................. 348/732
6,437,837 B1 * 8/2002 Seo ............................ 348/735

FOREIGN PATENT DOCUMENTS

| JP | 05-347736 | 12/1993 |
|----|-----------|---------|
| JP | 07-176992 | 7/1995 |
| JP | 10-276385 | 10/1998 |
| JP | 2000-059180 | 2/2000 |
| JP | 2000-059707 | 2/2000 |
| JP | 2000-092411 | 3/2000 |

* cited by examiner

Primary Examiner—Victor R. Kostak
(74) Attorney, Agent, or Firm—Crowell & Moring LLP

(57) ABSTRACT

A digital/analog television signal receiver includes a tuner which receives television signals in an ATSC system and an NTSC system. An analog television signal in the NTSC system is received by an automatic frequency tuning (AFT) at a time of an automatic pre-setting, and a frequency deviation amount for each receivable channel is detected by a CPU. Upon completion of the automatic pre-setting, the CPU calculates an average value of the frequency of deviation amounts of respective channels, and stores the average value in a memory as fine tuning data. Therefore, channel data is set by utilizing the fine tuning data when receiving a digital television signal in the ATSC system.

20 Claims, 4 Drawing Sheets

DIGITAL/ANALOG TELEVISION SIGNAL RECEIVER USING ANALOG SIGNAL CHANNEL FINE-TUNING DATA FOR SETTING DIGITAL SIGNAL CHANNELS

BACKGROUND OF THE INVENTION

1. Field of the Invention

The present invention relates to an analog/digital television signal receiver, and more specifically, to a digital/analog television receiver capable of receiving television signals in an ATSC and an NTSC system by a single tuner.

2. Description of the Prior Art

One example of such a kind of digital/analog television signal receiver is disclosed in, for example, Japanese Patent Laying-open No. 5-347736 [H04N 5/46, H04N 5/44, H04N 9/00] laid-open on Dec. 27, 1993 and Japanese Patent Laying-open No. 2000-59707 [H04N 5/44, H04B 1/16, H04B 1/26] laid-open on Feb. 25, 2000.

In such the digital/analog television signal receiver, due to a fact that a local oscillation frequency varied depending on an ambient temperature and a change over time in a case of receiving an analog television signal in the NTSC system, for example, an intermediate frequency signal was extracted after adjusting to an appropriate frequency by applying an automatic frequency control (AFC) (or an automatic frequency tuning (AFT)).

On the other hand, in a case of receiving a digital television signal in the ATSC-system, that is, an American standard, it did not require more than adjusting channel data of a frequency defined by the standard.

In this prior art, in a case of receiving the digital television signal, although the channel data defined by the standard was set, it was not possible to confirm whether or not a reception was made at a correct frequency. However, a digital television signal such as of the ATSC system is capable of reproducing (demodulating) and normally outputting images, sounds and etc. even if the frequency was deviated slightly. However, if a frequency deviation amount exceeds a permissive range, it was not possible to demodulate a television signal, and therefore, this led to a problem that a user could not enjoy a program on a channel selected by the user

SUMMARY OF THE INVENTION

Therefore, it is a primary object of the present invention to provide a novel digital/analog television signal receiver.

It is another object of the present invention to provide a digital/analog television signal receiver capable of eliminating a frequency variation and making a normal reception even in a case of receiving a digital television signal.

A digital/analog television signal receiver according to the present invention is a digital/analog television signal receiver capable of receiving a television signal in an ATSC system and an NTSC system by a single tuner alone, comprises: a detecting means which detects an amount of deviation in frequency on each channel capable of receiving an analog television signal at a time of automatic pre-setting; a calculating means which calculates an average value of the amount of deviation in frequency on said each channel; a storing means which stores said average value calculated by said calculating means; and a setting means which sets a channel data on the basis of said average value stored in said storing means upon receiving a digital television signal.

In another aspect of the present invention, a digital/analog television signal receiver capable of receiving a television signal in an ATSC system and an NTSC system by a single digital/analog television signal receiver, comprises: a detecting means which detects an amount of deviation in frequency upon receiving the analog television signal; a storing means which stores said amount of deviation in frequency detected by said detecting means; and a setting means which sets a channel data on the basis of said amount of deviation in frequency stored in said storing means upon receiving the digital television signal.

In the digital/analog television signal receiver, it is possible to receive a television signal in the ATSC system and the NTSC system by a single tuner alone. The detecting means detects an amount of deviation in frequency on each channel capable of receiving the analog television signal upon automatic pre-setting, and an average value with respect to the amount of deviation in frequency on each detected channel is calculated by the calculating means. That is, the amount of deviation with respect to all channels is calculated. The calculated average value is stored in the storing means, and the channel data is set on the basis of the average value thereof upon receiving the digital television signal. In other words, also in this case, it is possible to eliminate a frequency deviation because the channel data is controlled upon receiving the digital television signal by using the amount of deviation in frequency obtained upon receiving the analog television signal.

For example, the average value can be obtained by calculating a channel-to-channel average value. That is, if descriptions are made with respect to three consecutive channels such as channel 3, channel 4 and channel 5, the amount of deviation in frequency on the channel 4 can be determined by the average value of the amount of deviation of the channel 3 and the average value of the amount of deviation of the channel 5. This is nothing but the channel-to-channel average value, and the setting means can also set the channel data on the basis of the channel-to-channel average value.

In addition, it may also be possible that the channel data is set by using a standard deviation value after calculating the standard deviation value of the amount of deviation with respect to all channels.

According to the present invention, it is possible to make a normal reception even in a case of the digital television signal because the channel data of the digital television signal is controlled by the amount of deviation in frequency obtained upon receiving the analog television signal.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
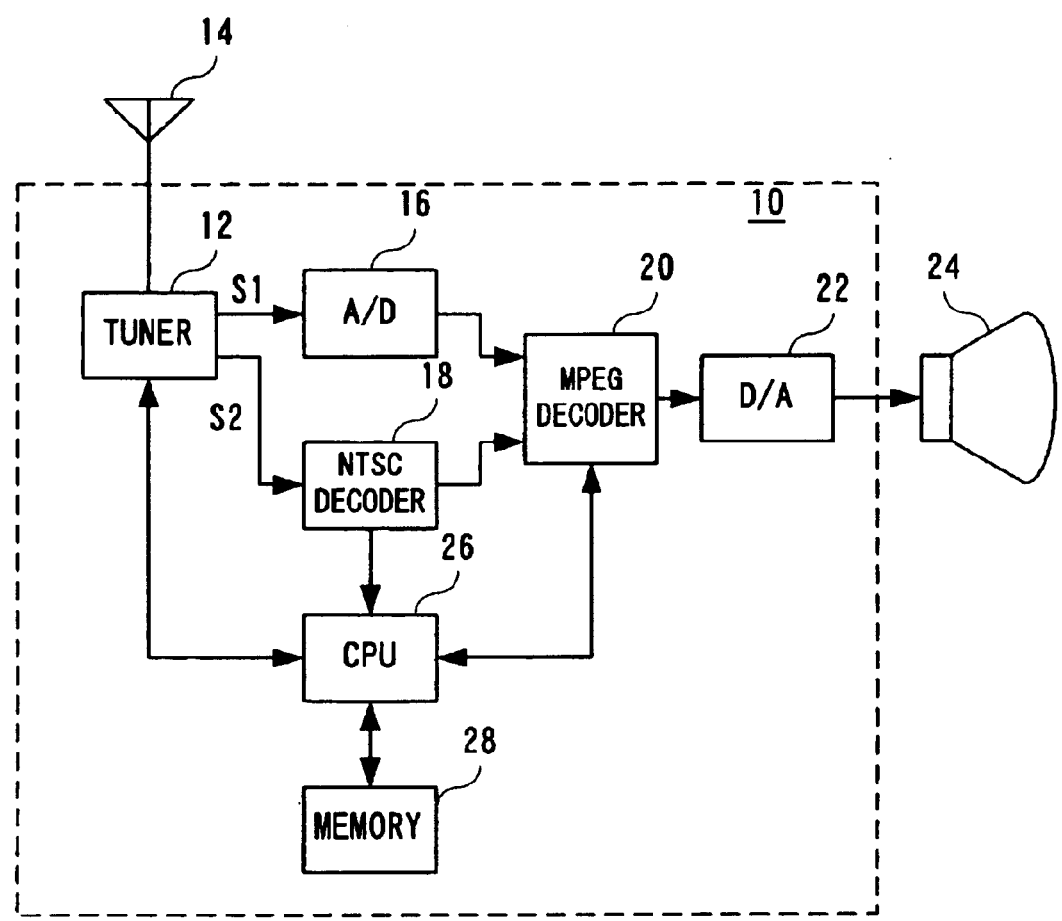
FIG. 1 is an illustrative view showing one embodiment of the present invention.

Referring to FIG. 1, a digital/analog television signal receiver (hereinafter briefly referred to as "receiver") 10 includes a tuner 12, and an antenna 14 is connected to the tuner 12. The antenna 14 receives a digitally modulated or analogly modulated terrestrial wave broadcast signal (television signal), and these television signals are inputted into the tuner 12. For example, in this embodiment, a television signal in an ATSC system (digital television signal), i.e. an American standard is received on the antenna 14, and a television signal in an NTSC system (analog television signal) is received on the antenna 14. In other words, it is possible to receive television signals both in the ATSC system and the NTSC system by a single tuner 12 alone.

The tuner 12 outputs an intermediate frequency wave signal S1 or S2 of the receiving digital television signal or the analog television signal in accordance with channel data set by a CPU 26.

For example, in this embodiment, the tuner 12 in a frequency synthesizer system is adopted, and the tuner 12 modifies a dividing ratio of a variable frequency divider (not shown) to receive a desired channel in accordance with data of frequency (frequency data) set by the CPU 26.

The CPU 26 receives a channel number inputted by a user by using an input device (not shown) provided on the receiver 10 or a remote control transmission device (not shown), and sets the channel data in accordance with the channel number to the tuner 12. In addition, the CPU 26 determines a kind of receiving television signal on the basis of the channel number inputted by the user. More specifically, it is determined whether or not the receiving television signal is a digital television signal or an analog television signal on the basis of a sub channel (minor channel) number.

Although illustration is omitted, a table of frequencies in correspondence to respective channels with respect to the digital television broadcast and a table of frequencies in correspondence to respective channels with respect to the analog television broadcast are stored in a memory 28. That is, the table of frequency of channels regulated by the standard in the ATSC system and the table of frequency of channels regulated by the standard in the NTSC system are stored.

Therefore, the CPU 26 determines the kind of television signals on the basis of the channel inputted by the user, and obtains the frequency in correspondence to the channel from the relevant table, and sets the frequency data (channel data) to the tuner 12 in correspondence to the frequency thereof.

In a case of receiving the digital television signal, the frequency data defined by the ATSC standard in correspondence to the channel inputted by the user is set in the tuner 12, and the intermediate frequency signal S1 is outputted. The intermediate frequency signal S1 is applied to an A/D converter 16, and converted into digital data. The intermediate frequency signal S1 converted into the digital data is MPEG-demodulated by an MPEG decoder 20. That is, image data (main image data and sub image data) and audio data are demodulated. The image data and the audio data are converted into analog signals by a D/A converter 22, and the image data converted into the analog signal is outputted from a display device 24 such as CRT, LCD or the like.

It is noted that the audio signal converted into the analog signal is outputted via an audio processing portion which is not shown, i.e. amplifier, speaker or the like.

In a case of receiving the analog television signal, frequency data defined by the NTSC standard in correspondence to the channel number inputted by the user is set in the tuner 12. In addition, in a case of receiving the analog television signal, if a deviation occurs in frequency, it then becomes impossible to properly receive the television signal, thus causing a disturbance to the outputted image and the sound, and therefore, the frequency is controlled by an automatic frequency tuning (AFI) circuit which is not shown, and an intermediate frequency signal S2 of the analog television signal is outputted from the tuner 12. The intermediate frequency signal S2 is applied to an NTSC decoder 18, and demodulated as a broadcast signal in the NTSC system. That is, the intermediate frequency signal S2 is demodulated as an image signal and audio signal in the NTSC system. The image signal is outputted from the display device 24 via the MPEG decoder 20 and the D/A converter 22.

However, a sub-image signal such as a channel number, texts or characters of a text broadcast, being displayed together with a main image signal on the display device 24 is superposed (added) onto the main image in the MPEG decoder 22. That is, in the MPEG decoder 20 and the D/A converter 22, no demodulation process and analog conversion process are applied to the image signal and the audio signal obtained by demodulating the analog television signal.

It is noted that the audio signal is applied to the sound processing portion via the MPEG decoder 20 and the D/A converter 22, and outputted from a speaker.

Furthermore, in a case of receiving the analog television signal, the CPU 26 receives V-sync data, H-sync data and chroma data and so on from the NTSC decoder 18, and determines whether or not there is an actual broadcasting in tune with the received analog television signal.

In a case of receiving the analog television signal, the receiver 10 thus controls or adjusts the local oscillation frequency in response to changes caused by an ambient temperature and a change with time in frequency. However, in a case of receiving the digital television signal, it does not require more than setting specific frequency data in accordance with a standard in the ATSC system because it is possible to normally reproduce (demodulate) the television signal, and view a program or the like even if the frequency is deviated in spite of changes in the ambient temperature and the change with time of the local oscillation frequency. Therefore, in a case that the frequency has been largely deviated, there is a problem that MPEG decoder 20 can not demodulate the television signal. That is, there is a case that it is not possible to view the desired program.

In order to avert this problem, in this embodiment, a frequency deviation amount (an offset value) for each channel of the analog television signal is detected at a time of an automatic pre-setting, and the frequency data (channel data) that is set in receiving the digital television signal is fine-tuned by using the offset value.

In addition, an average value of the offset values with regard to all channels is calculated, and the setting value is fine-tuned by the average value. At this time, a channel with no broadcast, i.e. a channel not capable of receiving the analog television signal is excluded in calculating the average value.

Figure 2:
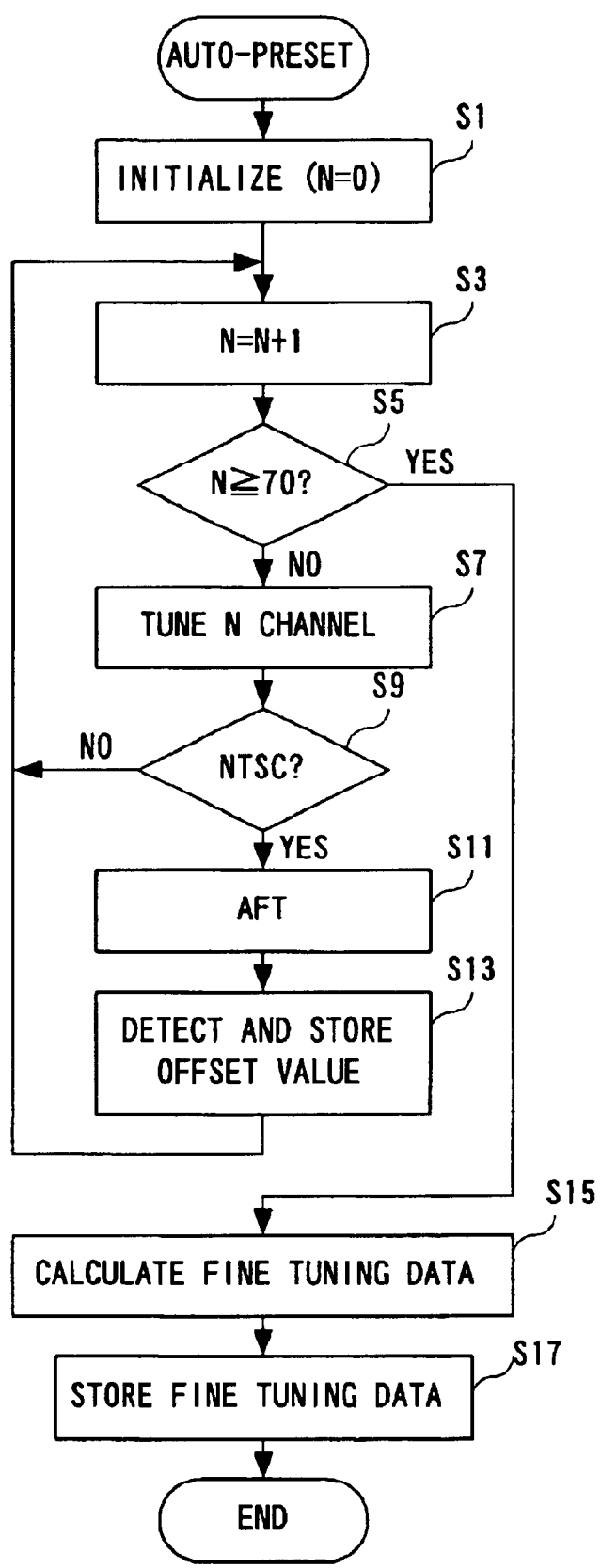
FIG. 2 is a flowchart showing an automatic pre-setting process of a CPU shown in FIG. 1 embodiment.
Figure 3:
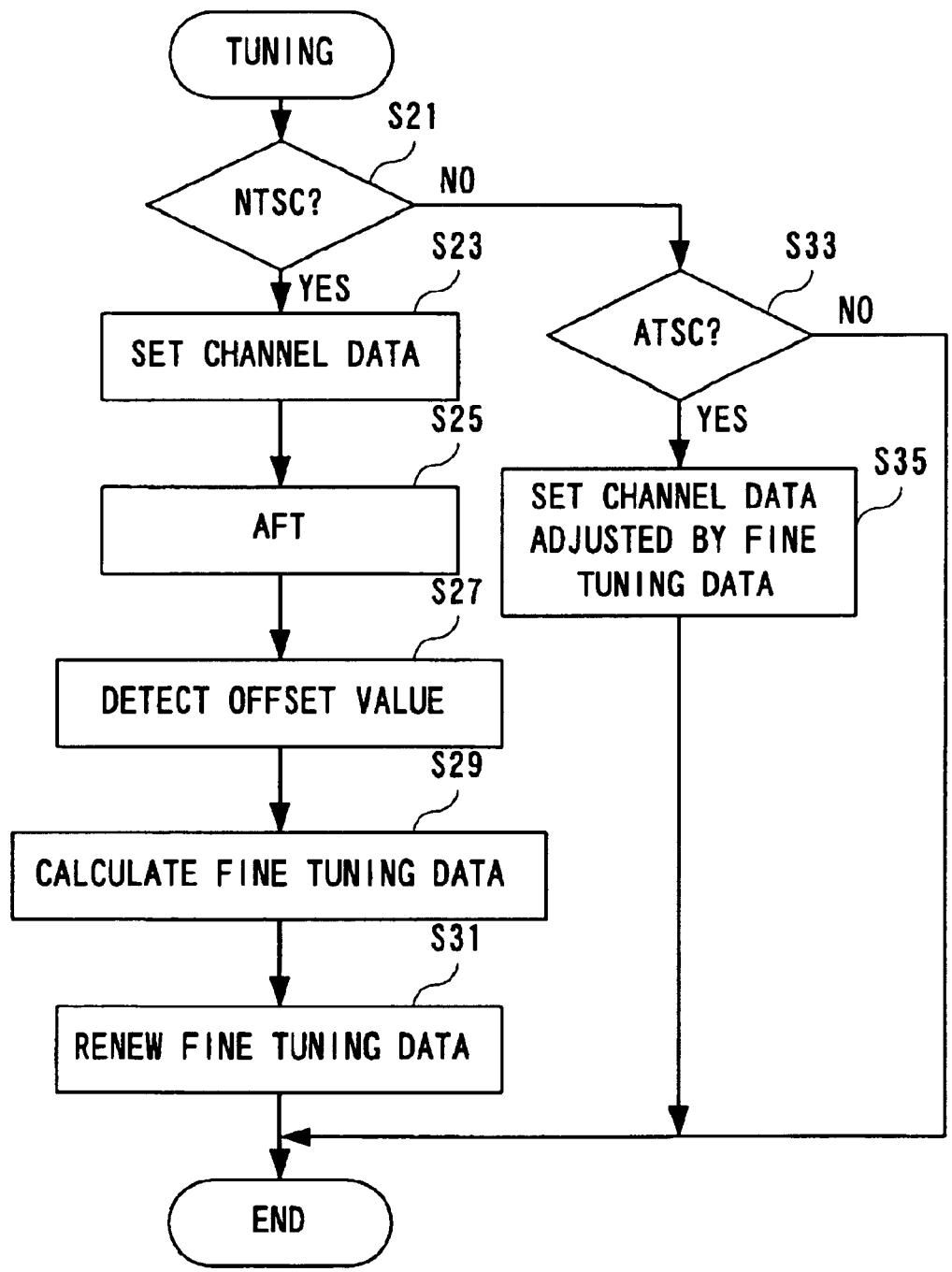
FIG. 3 is a flowchart showing a tuning process of the CPU shown in FIG. 1 embodiment.

More specifically, the CPU 26 executes an automatic pre-setting process as shown in FIG. 2, obtains the offset value, and calculates an average value (fine tuning data) of the offset value. Furthermore, the CPU 26 executes a tuning process as shown in FIG. 3, and controls or adjusts the channel data by the fine tuning data in receiving the digital television signal.

As shown in FIG. 2, when the user inputs a command of the automatic pre-setting by using an input device or the like, the CPU 26 starts a process in response thereto, and initializes (N=0) a count value (the number of channels) N of a counter (not shown) in a step S1. In a succeeding step S3, the count value N is incremented (N=N+1), and in a step S5, it is determined whether or not the count value N is 70 or more. That is, it is determined whether or not the pre-setting is completed with respect to all channels (69 channels).

If "NO" is determined in the step S5, that is, if the count value N is less than 70, a channel shown by the count value N is tuned to a tuning in a step S7. In a succeeding step S9, it is determined whether or not a tuned signal is a television signal of the NTSC system, i.e. an analog signal. If "NO" is determined in the step S9, that is, if the tuned signal is not the analog signal, the process directly returns to the step S3.

On the other hand, if "YES" is determined in the step S9, that is, in a case of the analog television signal, the CPU 26 instructs the tuner 12 to automatically control or adjust the frequency by using an AFT circuit in a step S11. Then, in a step S13, the automatically-controlled frequency is obtained from the tuner 12, a frequency deviation amount, i.e. an offset value is detected, and the process returns to the step S3 after storing the offset value into the memory 28.

More specifically, the CPU 26 obtains the frequency in correspondence to the tuned channel by referring to the frequency table that is corresponding to the channels set forth by the NTSC system and stored in the memory 28, and detects a difference between the frequency obtained from the table and the frequency obtained from the tuner 12, and stores the difference into the memory 28.

On the other hand, if "YES" is determined in the step S5, that is, if the count value N is 70 or more, it is determined that the channel setting (automatic pre-setting) and the obtaining of the offset values with respect to all the channels are completed. In a step S15, fine tuning data is calculated. More specifically, an average value with respect to all offset values stored in the memory 28 is calculated.

It is noted that the fine tuning data may be a channel-to-channel average value. That is, if descriptions are made with respect to consecutive three channels, e.g. channel 3, channel 4 and channel 5, the fine tuning data of the channel 4 is determined by the average value of the offset value upon tuning the channel 3 and the offset value upon tuning the channel 5.

In addition, since it is impossible to calculate the channel-to-channel average value with respect to channel 1 and channel 69, the offset values obtained upon tuning channel 1 and channel 69 are respectively determined as the fine tuning data.

In this manner, in a case of determining the channel-to-channel average value as the fine tuning data, the fine tuning data for each channel is calculated, and each fine tuning data is stored in the memory 28.

Furthermore, the fine tuning data can be also determined by calculating a standard deviation value of all offset values.

After calculating the fine tuning data, the CPU 26 stores the fine tuning data into the memory 28 in a step S17, and then terminates the process.

It is noted that the channel-frequency table of frequency set by the automatic pre-setting is separately stored in the memory 28, and used for a tuning process later.

After the automatic pre-setting process is carried out, the CPU 26 executes a tuning process shown in FIG. 3 at each time that a command is given by the user to select a station, i.e. change a channel.

More specifically, as shown in FIG. 3, the CPU 26 determines whether or not the television signal of the NTSC system is applied when the CPU 26 starts a tuning process in a step S21. That is, it is determined whether or not the analog signal is applied. If "YES" is determined in the step S21, that is, in a case of the analog television signal, in a step S23, frequency data (channel data) corresponding to the channel inputted by the user is set, that is, the frequency data is set by referring to the table obtained by the automatic pre-setting, and in a step S25, the CPU 26 instructs the tuner 12 to automatically control the frequency by the AFT circuit. In a succeeding step S27, the frequency value set by the tuner 12 is obtained, and a frequency of deviation value (offset value) is detected. It is noted that the offset value is detected as described in the step S13 shown in FIG. 2. Furthermore, the fine tuning data is calculated (recalculated) in a step S29, and in a step S31, the process is terminated after updating the fine tuning data stored in the memory 28.

On the other hand, if "NO" is determined in the step S21, that is, if the analog television signal is not applied, it is determined whether or not the television signal of the ATSC system is applied in a step S33. That is, it is determined whether or not the digital television signal is applied. If "NO" is determined in the step S33, that is, if the digital television signal is also not applied, the process is directly terminated by determining that it is not possible to make a normal reception. On the other hand, if "YES" is determined in the step S33, that is, if the digital television signal is detected, the channel data in correspondence to the channel inputted by the user is controlled or adjusted by the fine tuning data stored in the memory 28 in a step S35, and the channel data controlled or adjusted by the fine tuning data is set into the tuner 12, and then, the process is ended.

In addition in a case that the channel-to-channel average value is determined as the fine tuning data, the channel data is controlled or adjusted by the channel-to-channel average value in correspondence to the receiving channel.

According to this embodiment, it is possible to make a normal reception irrespective of the analog or digital television signal because the channel data in receiving the digital television signal is controlled or adjusted by the frequency deviation amount obtained upon the automatic pre-setting, i.e. upon receipt of the analog television signal. Therefore, it is possible to surely enjoy a desired program or the like.

Furthermore, it is possible to control or adjust the channel data by the appropriate fine tuning data even though the local oscillation frequency is varied due to an ambient temperature and a variation over time because the fine tuning data calculated upon pre-setting is to be renewed It is noted that in this embodiment, although the offset values with respect to all channels upon the automatic pre-setting are detected, it may be also possible that the offset values are respectively detected upon receiving the analog television signal with respect to all channels, the fine tuning data is calculated from the offset values, and the channel data is controlled upon receiving the digital television signal. However, in this case, there is a need that the analog television signals are to be received with respect to all channels, and the fine timing data is calculated before receiving the digital television signal.

In addition, in this embodiment, although the average value of the offset values is determined as the fine tuning data, it may be also possible that the offset values in correspondence to respective channels are stored as the respective fine tuning data, and the channel data is controlled by the fine tuning data of the corresponding channels in receiving the digital television signal. In this case, it becomes possible to adapt to changes due to an ambient temperature and a change over time of the local oscillation frequency if it is arranged in such a manner that the offset value (fine tuning data) of corresponding channel is renewed upon receiving the analog television signal at a time of a tuning process.

Furthermore, in this embodiment, a frequency-synthesizer-system tuner is adopted, but it may be also possible to adopt a voltage-synthesizer-system tuner. In this case, the tuner can be set with a tuning voltage so as to receive a desired channel in accordance with channel data set by the CPU 26. In this case, a table of tuning voltages in correspondence to all channels is stored the a memory with respect to each television signals in the ATSC system and the NTSC system.

Still furthermore, in this embodiment, although descriptions are made in a case of receiving a terrestrial wave broadcast, it is needless to say that the present invention can be also adapted to a case of receiving a cable television broadcast. In this case, a cable is connected to the tuner instead of the antenna.

In addition, in this embodiment, although descriptions are made in a case of receiving an American terrestrial wave broadcast, there is no need to say that this can be also adapted to a case of receiving a terrestrial wave broadcast of another country on condition that an identical system is adopted. However, a determination process of the count value N in the step S5 shown in FIG. 2 is to be changed because the channel number varies depending on each country or region.

In addition, in the above-described embodiments, one of the average value of the frequency deviation amounts (offset values), the channel-to-channel average value, and the standard deviation value for each channel is used as the channel data or the frequency data for selecting the digital television channel, but in stead of these values, a curve interpolated by a spline function may be used for setting such the channel data or the frequency data of the digital television signal.

Figure 4:
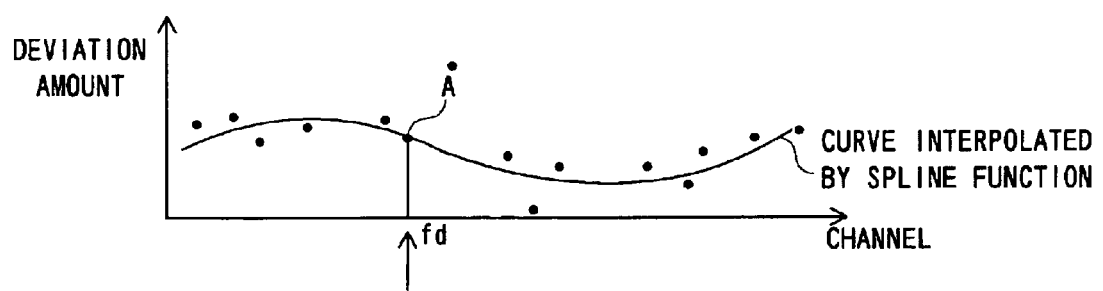
FIG. 4 is a graph showing a curve interpolated by a spline function.

In FIG. 4, a vertical axis indicates a frequency deviation amount and a horizontal axis indicates channels, and each black dot indicates a frequency deviation amount for each analog television channel. Then, all the frequency deviation amounts are interpolated by the spline function to produce a curve as shown in FIG. 4. Then, the deviation amount data on the curve interpolated by the spline function are stored for the respective channels as the fine tuning data. For example, if a channel fd is to be selected in the ATSC standard, the deviation amount on the curve at the channel fd is used read-out from the memory 28 and set as the channel or frequency data in the tuner 12.

If such the data interpolated by the spline function is used, it is possible to more surely set the channel or frequency data in the tuner in receiving the digital television signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital/analog television receiver capable of receiving television signals in an ATSC system and an NTSC system by a single tuner, comprising:
    a detecting means which detects a frequency deviation amount for each channel capable of receiving an analog television signal at a time of an automatic pre-setting;
    a calculating means which calculates an average value of the frequency deviation amount on respective channels;
    a storing means which stores said average value calculated by said calculating means; and
    a setting means which sets channel data on the basis of said average value stored in said storing means in receiving a digital television signal.

2. A digital/analog television receiver capable of receiving television signals in an ATSC system and an NTSC system by a single tuner, comprising:
    a detecting means which detects a frequency deviation amount of a received analog television signal;
    a storing means which stores said frequency deviation amount detected by said detecting means; and
    a setting means which sets channel data on the basis of said frequency deviation amount stored in said storing means in receiving a digital television signal.

3. A digital/analog television receiver according to claim 2, wherein said detecting means detects said frequency deviation amount upon an automatic pre-setting.

4. A digital/analog television receiver according to claim 2, wherein
    said detecting means includes an average value calculating means which detects a deviation amount for each channel capable of receiving an analog television signal, and calculates an average value of the deviation amount of respective channels, and
    said setting means sets said channel data on the basis of said average value.

5. A digital/analog television receiver according to claim 4, wherein
    said average value calculating means includes a channel-to-channel average value calculating means which calculates a channel-to-channel average value, and
    said setting means sets said channel data on the basis of said channel-to-channel average value.

6. A digital/analog television receiver according to claim 2, wherein
    said detecting means includes a standard deviation calculating means which detects a deviation for each channel capable of receiving the analog television signal, and calculates a standard deviation value of the deviation amount for each channel, and
    said setting means sets said channel data on the basis of said standard deviation value.

7. A control method for a digital/analog television receiver capable of receiving television signals in the ATSC system and the NTSC system by a single tuner, comprising following steps of:
    (a) detecting a frequency deviation amount of a received analog television signal;
    (b) storing said frequency deviation amount detected in said step (a); and
    (c) setting channel data on the basis of said frequency deviation amount stored in said step (b) in receiving a digital television signal.

8. A method according to claim 7, wherein said step (a) is executed upon automatic pre-setting.

9. A method according to claim 7, wherein
    said step (a) includes steps of, (a1) detecting the deviation amount for each channel capable of receiving the analog television signal, and (a2) calculating an average value of the deviation amounts of channels, and
    said step (c) sets said channel data on the basis of said average value.

10. A method according to claim 7, wherein
said step (a) includes steps of, (a1) detecting the frequency deviation amount for each channel capable of receiving the analog television signal, and (a3) calculating a standard deviation value of the deviation amount for said each channel, and
said step (c) sets said channel data on the basis of said standard deviation value.

11. A digital/analog television receiver according to claim 3, wherein
said detecting means includes an average value calculation which detects a deviation amount for each channel capable of receiving an analog television signal, and calculates an average value of the deviation amount of respective channels, and
said setting means sets said channel data on the basis of said average value.

12. A digital/analog television receiver according to claim 3, wherein
said detecting means includes a standard deviation calculating means which detects a deviation for each channel capable of receiving the analog television signal, and calculates a standard deviation value of the deviation amount for each channel, and
said setting means sets said channel data on the basis of said standard deviation value.

13. A method according to claim 8, wherein
said step (a) includes steps of, (a1) detecting the deviation amount for each channel capable of receiving the analog television signal, and (a2) calculating an average value of the deviation amounts of channels, and
said step (c) sets said channel data on the basis of said average value.

14. A method according to claim 8, wherein
said step (a) includes steps of, (a1) detecting the frequency deviation amount for each channel capable of receiving the analog television signal, and (a3) calculating a standard deviation value of the deviation amount for said each channel, and
said step (c) sets said channel data on the basis of said standard deviation value.

15. A digital/analog television receiver capable of receiving television signals in an ATSC system and an NTSC system by a single tuner, comprising:
a detector which detects a frequency deviation amount for each channel capable of receiving an analog television signal at a time of an automatic pre-setting;
a calculating device which calculates an average value of the frequency deviation amount on respective channels;
a storage device which stores said average value calculated by said calculating device; and
a setting device which sets channel data on the basis of said average value stored in said storage device in receiving a digital television signal.

16. A digital/analog television receiver capable of receiving television signals in an ATSC system and an NTSC system by a single tuner, comprising:
a detector which detects a frequency deviation amount of a received analog television signal;
a storage device which stores said frequency deviation amount detected by said detector; and
a setting device which sets channel data on the basis of said frequency deviation amount stored in said storage device in receiving a digital television signal.

17. A digital/analog television receiver according to claim 16, wherein said detector detects said frequency deviation amount upon an automatic pre-setting.

18. A digital/analog television receiver according to claim 16, wherein
said detector includes an average value calculator which detects a deviation amount for each channel capable of receiving an analog television signal, and calculates an average value of the deviation amount of respective channels, and
said setting device sets said channel data on the basis of said average value.

19. A digital/analog television receiver according to claim 18, wherein
said average value calculator includes a channel-to-channel average value calculator which calculates a channel-to-channel average value, and
said setting device sets said channel data on the basis of said channel-to-channel average value.

20. A digital/analog television receiver according to claim 16, wherein
said detector includes a standard deviation calculator which detects a deviation for each channel capable of receiving the analog television signal, and calculates a standard deviation value of the deviation amount for each channel, and
said setting device sets said channel data on the basis of said standard deviation value.

* * * * *